(12) United States Patent
Panahpour Tehrani et al.

(10) Patent No.: US 8,811,717 B2
(45) Date of Patent: Aug. 19, 2014

(54) IMAGE GENERATING APPARATUS AND COMPUTER PROGRAM

(75) Inventors: Mehrdad Panahpour Tehrani, Saitama (JP); Akio Ishikawa, Saitama (JP); Shigeyuki Sakazawa, Saitama (JP)

(73) Assignee: KDDI Corporation, Tokyo (JP)

( * ) Notice: Subject to any disclaimer, the term of this patent is extended or adjusted under 35 U.S.C. 154(b) by 1238 days.

(21) Appl. No.: 12/491,835

(22) Filed: Jun. 25, 2009

(65) Prior Publication Data

US 2010/0074468 A1 Mar. 25, 2010

(30) Foreign Application Priority Data

Sep. 25, 2008 (JP) ................................. 2008-245765

(51) Int. Cl.
*G06K 9/00* (2006.01)
*G06T 7/00* (2006.01)
(52) U.S. Cl.
CPC ..... *G06T 7/0077* (2013.01); *G06T 2207/10021* (2013.01)
USPC ............. 382/154; 382/107; 382/236; 356/12; 359/462; 348/159
(58) Field of Classification Search
USPC ............. 382/107, 154, 236; 356/12; 359/462; 348/159
See application file for complete search history.

(56) References Cited

U.S. PATENT DOCUMENTS

| | | | | |
|---|---|---|---|---|
| 5,530,774 A * | 6/1996 | Fogel | ............................. | 382/154 |
| 7,035,453 B2 * | 4/2006 | Liu | ................................ | 382/154 |
| 7,257,272 B2 * | 8/2007 | Blake et al. | .................... | 382/275 |
| 7,292,735 B2 * | 11/2007 | Blake et al. | .................... | 382/275 |
| 7,505,623 B2 * | 3/2009 | Jones et al. | .................... | 382/162 |
| 2003/0202592 A1 * | 10/2003 | Sohn et al. | ............... | 375/240.16 |
| 2005/0058336 A1 * | 3/2005 | Russell et al. | ................ | 382/154 |
| 2005/0286759 A1 * | 12/2005 | Zitnick et al. | ................. | 382/154 |
| 2007/0110298 A1 * | 5/2007 | Graepel et al. | ................ | 382/154 |
| 2008/0130738 A1 * | 6/2008 | Lee et al. | ................. | 375/240.01 |
| 2010/0309292 A1 * | 12/2010 | Ho et al. | .......................... | 348/47 |
| 2011/0026807 A1 * | 2/2011 | Wang | ............................ | 382/154 |

FOREIGN PATENT DOCUMENTS

| | | |
|---|---|---|
| JP | A-2006-65862 | 3/2006 |
| JP | A-2008-15756 | 1/2008 |

OTHER PUBLICATIONS

Naemura et al., "Ray-Based Creation of Photo-Realistic Virtual World", IEEE, VSMM97, 1997, pp. 59-68.
Droese et al., "Ray-Space Interpolation based on Filtering in Disparity Domain", Proc. of 3D Image Conference 2004, 2004, pp. 1-4.
Mar. 27, 2012 Office Action issued in Japanese Patent Application No. 2008-245765 (with translation).

* cited by examiner

*Primary Examiner* — Matthew Bella
*Assistant Examiner* — Julian Brooks
(74) *Attorney, Agent, or Firm* — Oliff PLC (57) ABSTRACT

The present invention relate to an image generating apparatus for generating an image from a viewpoint specified by a user. According to the invention, the apparatus has a storage unit that stores data of a plurality of images, and a disparity map generating unit that generates a disparity map. The disparity map is associated with a pair of images including a first image and a second image, and indicates corresponding pixels in the first and second images.

11 Claims, 9 Drawing Sheets

| PIXEL | DISPARITY INFOR- MATION |
|---|---|
| ⋮ | ⋮ |
| 51 | Δa |
| ⋮ | ⋮ |

VIEWPOINT 500

Fig. 9B

| PIXEL | DISPARITY INFOR- MATION |
|---|---|
| ⋮ | ⋮ |
| 62 | Δb |
| ⋮ | ⋮ |

VIEWPOINT 600

Fig. 9C

| PIXEL | DISPARITY INFOR- MATION |
|---|---|
| ⋮ | ⋮ |
| 73 | Δc1 |
| ⋮ | ⋮ |

VIEWPOINT 700

IMAGE GENERATING APPARATUS AND COMPUTER PROGRAM

PRIORITY CLAIM

This application claims priority from Japanese patent application No. 2008-245765 filed on Sep. 25, 2008, which is incorporated herein by reference.

BACKGROUND OF THE INVENTION

1. Field of the Invention

The present invention relates to an apparatus for a free viewpoint video system.

2. Description of the Related Art

Various proposals has been made for generating a free viewpoint video from motion pictures captured by several cameras, for example, in Japanese patent publication 2008-15756A1, "Ray-Based Creation of Photo-Realistic Virtual World" by Takeshi Naemura, et al. (VSMM97, pp. 59-68) and "Ray-Space Interpolation based on Filtering in Disparity Domain" by Michael Droese, et al. (Proc. of 3D Image Conference 2004)

The method proposed in above documents is called image based rendering. More specifically, a ray-space is generated using a plurality of images captured by a plurality of cameras, and an image from an arbitrary viewpoint is generated by interpolation using the ray space.

SUMMARY OF THE INVENTION

In a free viewpoint video system, in response to input an arbitrary viewpoint from a user terminal such as a personal computer, a video signal from the viewpoint is generated and displayed on the user terminal. To realize such a free viewpoint video system, it is required to shorten the image generating time. If images of almost all viewpoints could be generated and stored in an image generating apparatus beforehand, the image generating time could be short enough. However, it is not realistic.

The invention has been made in view of the above-mentioned problem, and it is therefore an object of the present invention to provide an image generating apparatus, which generates images from an arbitrary viewpoint as quick as possible, as well as the computer program, which functions a computer as the apparatus.

According to the invention, an image generating apparatus has a storage unit configured to store data of a plurality of images, and a disparity map generating unit configured to generate a disparity map. The disparity map is associated with a pair of images including a first image and a second image, and indicates corresponding pixels in the first and second images.

Preferably, the disparity map is associated with a viewpoint and indicates corresponding pixels in the first and second images to each pixel in an third image from the viewpoint. The viewpoint is placed on the same position as a first viewpoint of the first image, on the same position as a second viewpoint of the second image or between the first viewpoint and the second viewpoint.

To generate the disparity map, the disparity map generating unit sets a search range in the first and second images such that a center of each search range is located at the same pixel position as a third pixel in the third image. Then the disparity map generating unit determines a first pixel corresponding to the third pixel from the search range in the first image, and determines a second pixel corresponding to the third pixel from the search range in the second image. Preferably, a size of the search range in the first image is decided based on a distance between the first viewpoint and the viewpoint of the third image, and a size of the search range in the second image is decided based on a distance between the second viewpoint and the viewpoint of the third image.

Advantageously, the disparity map generating unit selects the first pixel and the second pixel such that the first pixel, the second pixel and the third pixel lie in a straight line, in case the first image, the second image and the third image are arranged parallel to each other with a distance proportional to a distance between viewpoints of images.

According to another aspect of the invention, some images stored in the storage unit are ones captured by cameras, and other images are generated from the images captured by cameras.

Preferably, viewpoints of images stored in the storage unit are placed on a first area having no object and a second area having one or more objects, images from viewpoints in the first area includes a whole or part of the second area, and images from viewpoints in the second area are generated based on images from viewpoints in the first area.

Viewpoints in the second area can be arranged on the predetermined line, on the object or behind the object with respect to the first area. Further, viewpoints in the second area can be arranged such that they surround the object.

A computer program according to the invention functions a computer as the image generating apparatus. Further, a computer readable medium according to the invention includes the computer program.

The apparatus according to the invention does not have pixel values for all rays in a ray-space. If the apparatus does not have a pixel value for a pixel in a required image, the apparatus generates a pixel value based on a disparity map. The calculation of the pixel value based on the disparity map is easy, and it is possible to reduce data amount stored in the storage unit. Further, the apparatus has images in the second area in advance. With this configuration, it is possible to generate an image from a viewpoint, which is occluded from the first area.

Further objects and advantages of the present invention will be apparent from the following description of the preferred embodiments of the invention as illustrated in the accompanying drawings.

DETAILED DESCRIPTION OF THE INVENTION

A viewpoint is specified by a position and a direction, and "an image of a viewpoint" or "an image from a viewpoint" means an image within the predetermined visual field at the position and the direction specified by the viewpoint in the following description. Further, an image of a viewpoint A is referred to as "an image A".

Figure 1:
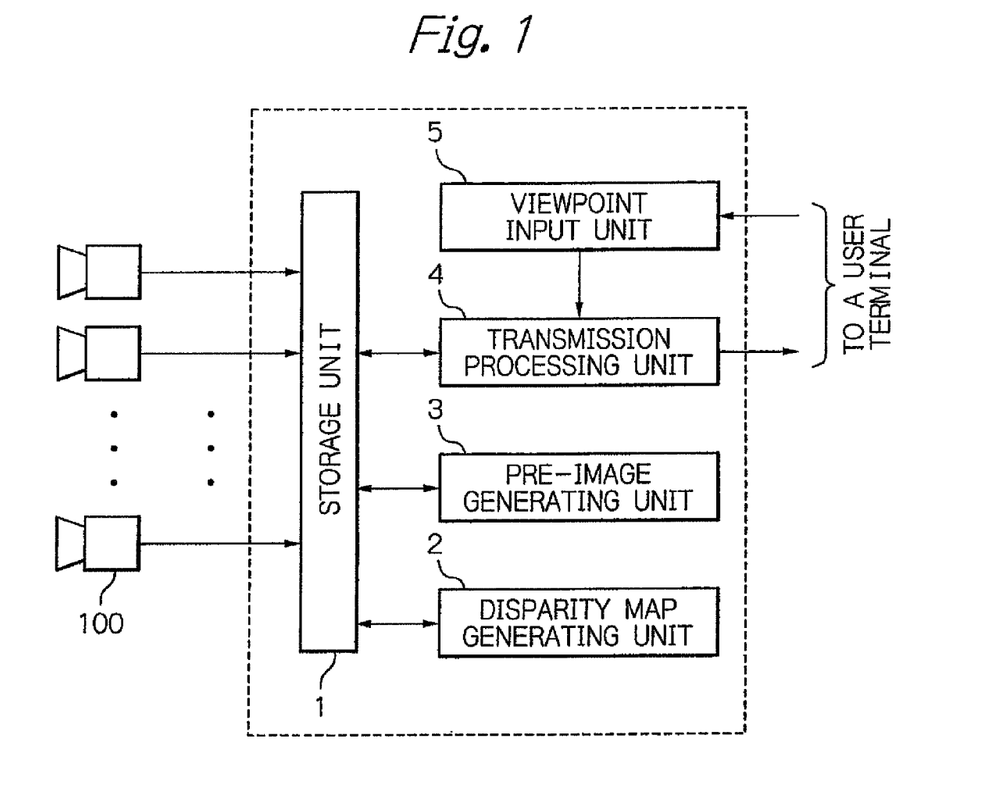
FIG. 1 shows a block diagram of an image generating apparatus according to the invention.
Figure 2:
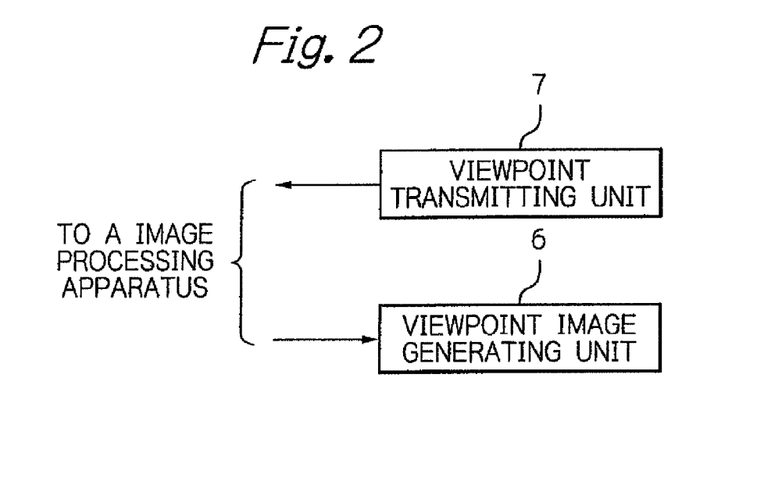
FIG. 2 shows a block diagram of a user terminal according to the invention.

FIG. 1 shows a block diagram of an image generating apparatus according to the invention. As shown in FIG. 1, the image generating apparatus has a storage unit 1, a disparity map generating unit 2, a pre-image generating unit 3, a transmission processing unit 4 and a viewpoint input unit 5. Furthermore, FIG. 2 shows a block diagram of a user terminal according to the invention. As shown in FIG. 2, the user terminal includes a viewpoint image generating unit 6 and a viewpoint transmitting unit 7. The image generating apparatus and the user terminal can communicate each other via communication networks such as the Internet. It is noted FIG. 1 and FIG. 2 show units required for describing the invention.

The storage unit 1 stores data of camera parameters for each camera 100, a plurality of images in motion pictures captured by cameras 100, a plurality of images generated by interpolation from images captured by cameras 100 at the pre-image generating unit 3, and a plurality of disparity maps generated at the disparity map generating unit 2 based on images. Hereinafter, each image in motion pictures captured by cameras 100 is referred to as "captured image", each image generated from captured images at the pre-image generating unit 3 is referred to as "interpolated image". Further, both "captured image" and "interpolated image" are referred to collectively as "pre-image". The storage unit 1 has data indicating a relation between a captured image and the camera 100, which captures the captured image. In the invention, cameras 100 are placed along a predetermined line in an area, and capture motion pictures including one or more objects. Hereinafter, the area, where objects do not exit and cameras 100 are placed, is referred to as "the first area", and the area, where one or more objects exit and cameras 100 are not placed, is referred to as "the second area". In the embodiment, the predetermined line is a straight line or a circle, however any curve line can be used. In case the straight line, each optical axis of each camera 100 is the same height and the same direction, and in case the circle line, each optical axis of each camera 100 is the same height and directed to the center of the circle.

The viewpoint transmitting unit 7 of the user terminal sends viewpoint data indicating a viewpoint specified by a user of the user terminal to the image generating apparatus. The viewpoint input unit 5 of the image generating apparatus receives viewpoint data from the user terminal, and outputs viewpoint data to the transmission processing unit 4. The transmission processing unit 4 selects data, which is required to generate images from the viewpoint indicated by viewpoint data based on pre-images and disparity maps stored in the storage unit 1, and sends selected data to the user terminal. The viewpoint image generating unit 6 of the user terminal receives data from the image generating apparatus, and generates images of the viewpoint based on received data. Off course, the image generating apparatus can generate images of the viewpoint, and sends data of generated images to the user terminal. In this case, the viewpoint image generating unit 6 is incorporated in the transmission processing unit 4, and user terminal just decodes data from the image generating apparatus and displays images obtained by decoding.

Figure 3:
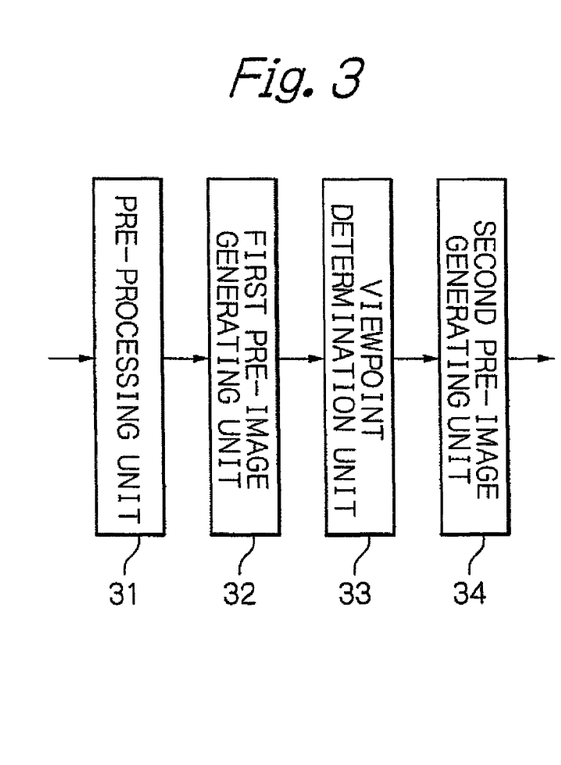
FIG. 3 shows a block diagram of a pre-image generating unit.

FIG. 3 shows a block diagram of the pre-image generating unit 3. As shown in FIG. 3, the pre-image generating unit 3 has a pre-processing unit 31, a first pre-image generating unit 32, a viewpoint determination unit 33 and a second pre-image generating unit 34. The pre-processing unit 31 performs calibration of camera parameters of each camera 100 based on captured images captured almost the same time. Then pre-processing unit 31 performs matting of each pixel of captured images. More specifically, the pre-processing unit 31 determines whether each pixel corresponds to an object or not. For pixels corresponding to objects, the pre-processing unit 31 determines the position of objects and generates model information, which indicates the position of each pixel corresponding to the object. Model information is also called the range image. The pre-processing unit 31 can use any known-method for calibration of camera parameters, matting and modeling.

Figure 4A:
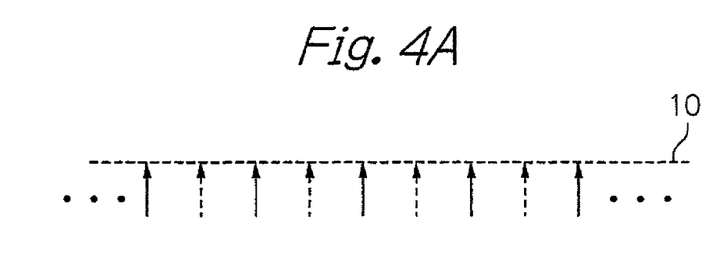
FIGS. 4A and 4B are explanation drawings of a viewpoint of an interpolated image in the first area.
Figure 4B:
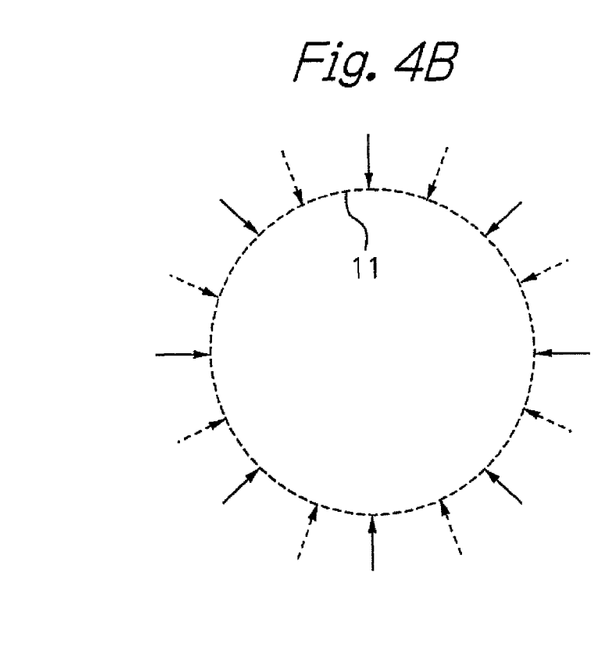

The first pre-image generating unit 32 generates an interpolated image, a viewpoint of which is located between cameras 100 on the same predetermined line for placing cameras 100. FIGS. 4A and 4B are explanation drawings of a viewpoint of an interpolated image generated by the first pre-image generating unit 32. In FIGS. 4A and 4B, a solid arrow denotes a viewpoint of a captured image, i.e. camera position and direction, and a dotted arrow denotes a viewpoint of the interpolated image to be generated from captured images. FIG. 4A shows a case that the predetermined line is a straight line 10, while FIG. 4B shows a case that the predetermined line is a circle 11. In the following description, both "captured image" and "interpolated image" generated by the first pre-image generating unit 32" are referred to collectively as "first pre-image". The density of viewpoints for the first pre-images is decided by a capacity of the storage unit 1, required resolution and so on. An interpolated image is generated from captured images, which are close to the interpolated image, by considering a distance between the interpolated image and captured images. For example, it is preferable to use adjacent captured images to generate the interpolated image. Model information is also generated for each interpolated image based on model information of captured images.

Figure 5A:
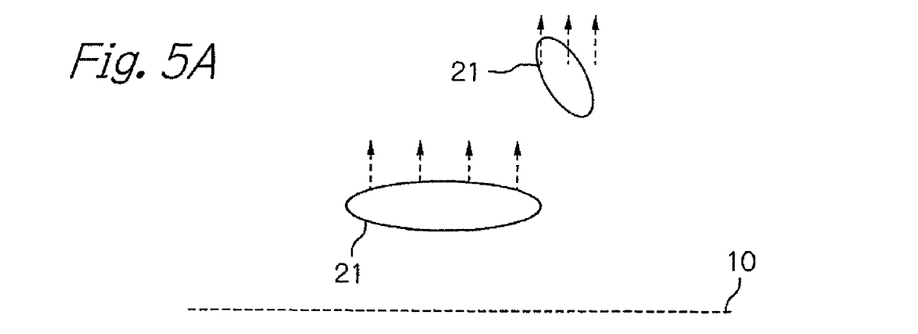
FIGS. 5A, 5B, 5C and 5D are explanation drawings of viewpoints determined by a viewpoint determination unit.
Figure 5B:
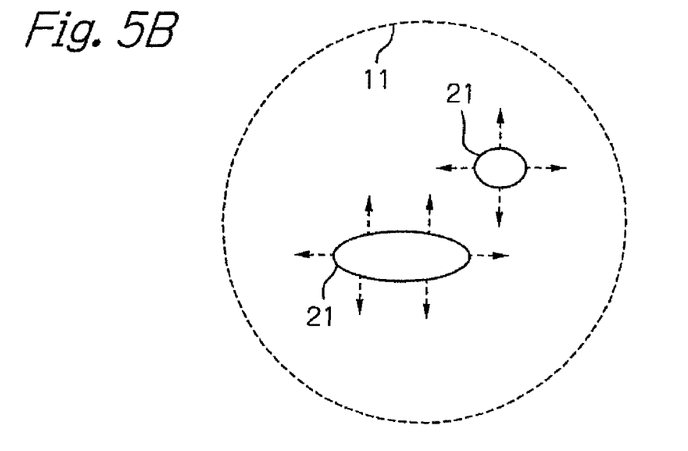

The viewpoint determination unit 33 determines viewpoints of images in the second area based on a size and a position of each object in the second area. FIGS. 5A, 5B, 5C and 5D are explanation drawings of viewpoints determined by the viewpoint determination unit 33. The arrangement of camera 100 in FIG. 5A is the same as the one in FIG. 4A, and the arrangement of camera 100 in FIG. 5B is the same as the one in FIG. 4B. In FIGS. 5A and 5B, each dotted arrow denotes a viewpoint in the second area determined by the viewpoint determination unit 33. In case cameras 100 are arranged on the straight line 10, as shown in FIG. 5A, another straight line (not shown in FIG. 5A), which is parallel to the straight line 10, is set on each object 21 or behind each object 21 with respect to the straight line 10, and at lease two viewpoints are set on each line on or behind each object 21. The number of viewpoints is increased as the size of the object 21 increases. Preferably, the density of viewpoints on the line on or behind each object 21 is the same as the one on the straight line 10.

In case cameras 100 are arranged on the circle 11 such that camera 100 are pointed at the center of the circle 11, as shown in FIG. 5B, viewpoints are set on the boundary of the object 21 or on a circle/an ellipse which surrounds the object 21. It is preferable to set at least four viewpoints in four directions. The number of viewpoints is increased as the size of the object 21 increases. Preferably, the density of viewpoints is the same as the one on the circle 11.

Figure 5C:
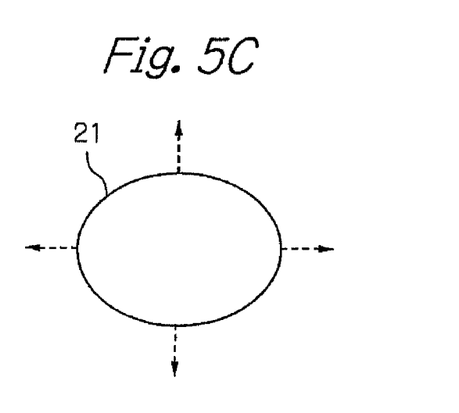
Figure 5D:
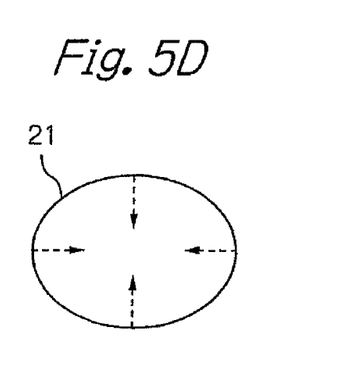

In case cameras 100 are arranged on the circle 11, there are two way to set viewpoint as shown in FIG. 5C and FIG. 5D. In FIG. 5C, viewpoints are set such that viewpoints are directed outward of the circle or ellipse. On the contrary in FIG. 5D, viewpoints are set such that viewpoint are directed inward of the circle or ellipse.

Figure 6:
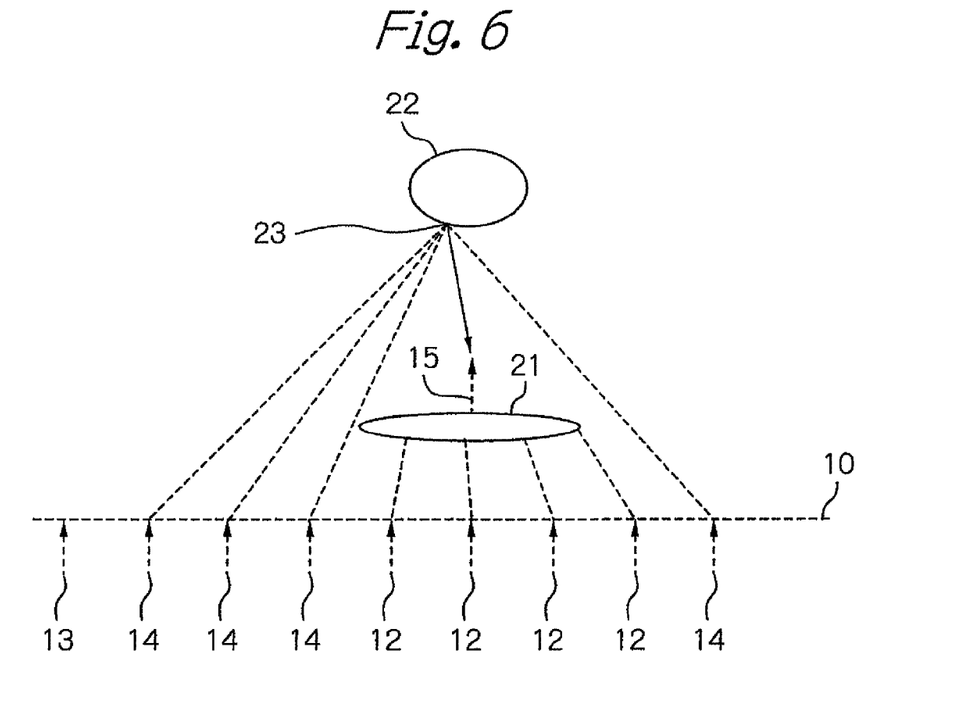
FIG. 6 is an explanation drawing of a second pre-image generated by a second pre-image generating unit.

The second pre-image generating unit 34 generates images of viewpoints determined by the viewpoint determination unit 33 based on first pre-images on the straight line 10 or the circle 11. In other words, the pre-image generating unit 34 generates images based on captured images and interpolated images generated by the first pre-image generating unit 32. FIG. 6 is an explanation drawing of a second pre-image generated by the second pre-image generating unit 34. FIG. 6 shows the case that cameras 100 are arranged on the straight line 10. In FIG. 6, a reference numeral 15 denotes a viewpoint determined by the viewpoint determination unit 33 due to the existence of an object 21, and the second pre-image generating unit 34 generates an image from the viewpoint 15. To generate the image from the viewpoint 15, the second pre-image generating unit 34 needs to decide a pixel value of a pixel corresponding to a point 23 on an object 22. However, images of viewpoints 12 on the straight line 10 have no information about a color of the point 23, because the point 23 is hidden from viewpoints 12 by the object 21. Further, an image of a viewpoint 13 on the straight line 10 also have no information about a color of the point 23, because the point 23 is outside of the field of the image from the viewpoints 13. In FIG. 6, images that have information about a color of the point 23 are ones from viewpoints 14, thus the second pre-image generating unit 34 decides the value of the pixel corresponding to the point 23 by searching images having color information for the pixel.

To search images having color information for each pixel, the second pre-image generating unit 34 needs to identify the position of each object, and model information of first pre-images stored in the storage unit 1 is used to determine the position of each object. If a viewpoint is placed on an object, the second pre-image generating unit 34 generates an image from the viewpoint on the assumption that the object does not exit.

Figure 7A:
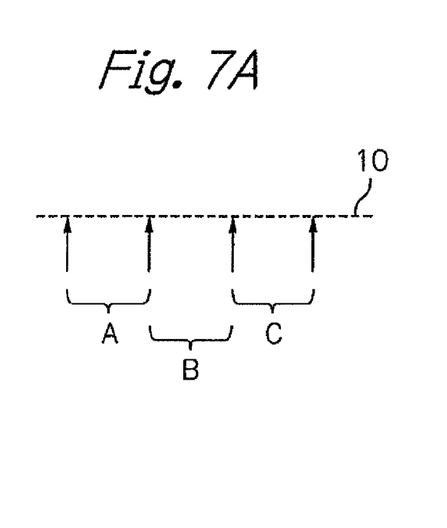
FIGS. 7A and 7B show a pair of images used for generating a disparity map.
Figure 7B:
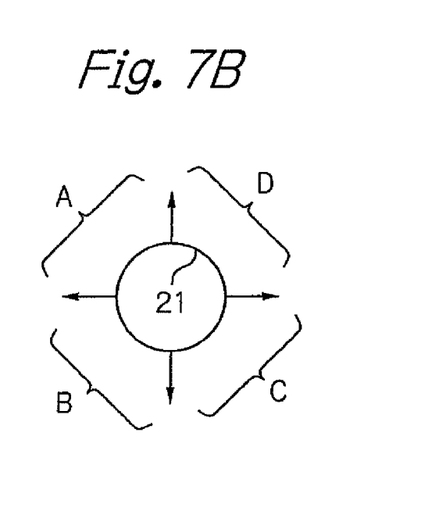

The disparity map generating unit 2 in FIG. 1 generates one or more disparity maps for each pair of pre-images, of which viewpoints lie next to each other on the predetermined line or around each object. FIGS. 7A and 7B show a pair of pre-images used for generating a disparity map. In FIGS. 7A and 7B, solid arrows denote viewpoints of pre-images. As shown in FIG. 7A, in case there are four viewpoints on the straight line 10, one or more disparity maps are generated for each pair A, B and C. As shown in FIG. 7B, in case there are four viewpoints around the object 21, one or more disparity maps are generated for each pair A, B, C and D.

Figure 8A:
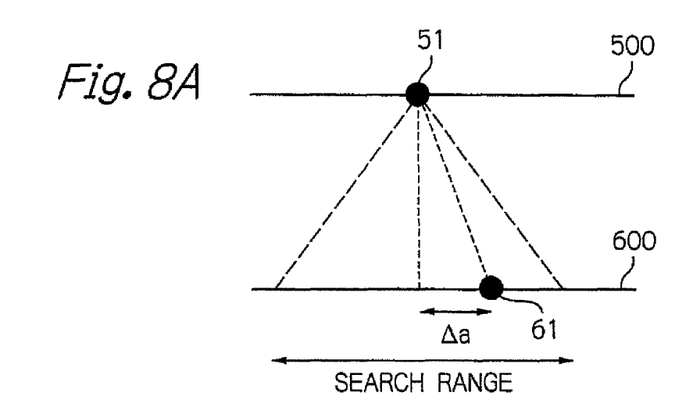
FIGS. 8A, 8B and 8C are explanation drawings of a disparity map generation.
Figure 8B:
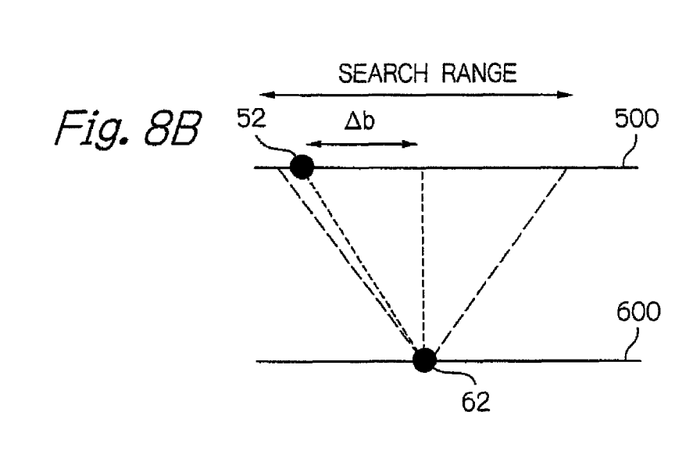
Figure 8C:
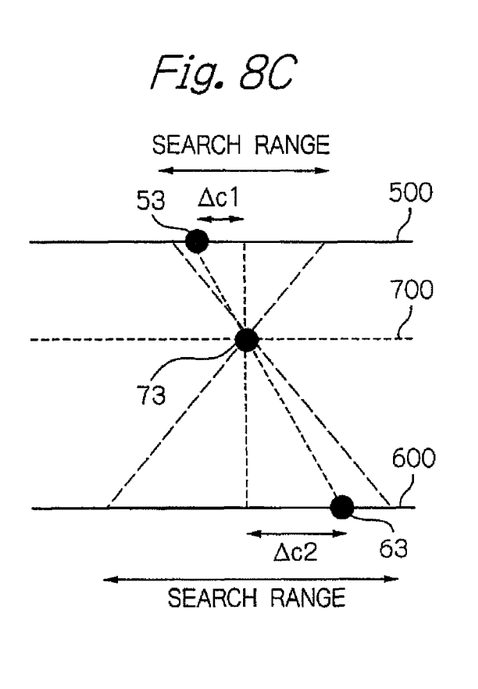

FIGS. 8A, 8B and 8C are explanation drawings of a disparity map generation. Each disparity map is associated with a pair of pre-images. Further, each disparity map is associated with a viewpoint between the associated pair of pre-images. The associated viewpoint can be located on the same line, on which the associated pair of pre-images is arranged. However, the associated viewpoint can be located on the straight line, even though the associated pair of pre-images is arranged, for example, on the circle 11. Preferably, the direction of the associated viewpoint is the same as the associated pair. In other words, the associated viewpoint is directed toward the second area, in case the viewpoint is on the line 10 or the circle 11 in the first area. If the associated viewpoint is located in the second area, the direction is decided as the same or similar way that the viewpoint determination unit 33 does.

FIGS. 8A to 8C show a generation of three disparity maps, each of which is associated with an pair of pre-images including images from viewpoints 500 and 600. The first disparity map is associated with the viewpoint 500, the second disparity map is associated with the viewpoint 600, and the third disparity map is associated with a viewpoint 700, which is located between viewpoints 500 and 600.

In the following description, images of each viewpoint are set parallel each other such that a straight line connecting the same pixel position in each image becomes perpendicular to each image, and the distance between images is proportional to the distance between viewpoints. Further, an image is represented as a line in figures seeing from above, for example, FIGS. 8A to 8C and 10.

Figure 9A:
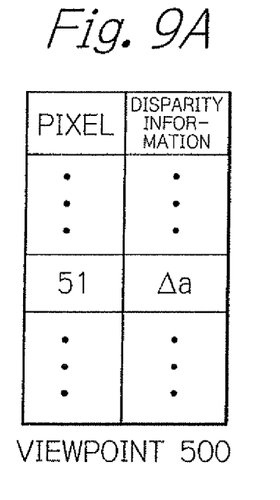
FIGS. 9A, 9B and 9C show a exemplary embodiment of a disparity map.

FIG. 8A shows a generation of the first disparity map associated with the viewpoint 500. For a pixel 51 in the pre-image 500, a search range is set in the pre-image 600. The center of the search range is the same pixel location as the pixel 51, and a size of the search range is predetermined. However, the size of the search range can be determined base on a distance between pre-images 500 and 600. In this case, the size is increased as the distance increasing. From pixels in the search range, a pixel that may be considered indicating the same point as the pixel 51 is determined. That is, a pixel corresponding to the pixel 51 is determined. For this determination, it is prefer to use a block matching method. More specifically, correlations between a predetermined size of pixel block centered at the pixel 51 to each pixel block in the search range are calculated, and a center pixel in the most correlated pixel block in the search range is determined as the pixel corresponding to the pixel 51. The correlation is obtained by accumulating absolute values or square values of pixel value differences on the same location in each block. In this case, the higher the correlation, the smaller the accumulating value. In FIG. 8A, a pixel 61 is determined as the corresponding pixel to the pixel 51. In this case, an offset Δa from the center of the search range is recoded as disparity information for the pixel 51, as shown in FIG. 9A. To generate the first disparity map, disparity information for each pixel in the pre-image 500 is determined. For simplification, FIGS. 8A to 8C and 9A to 9C show only one offset value, for example value Δa in FIGS. 8A and 9A. However, there are two offset values for a horizontal direction and a vertical direction for each pixel, because the search range is a plane, not a line.

Figure 9B:
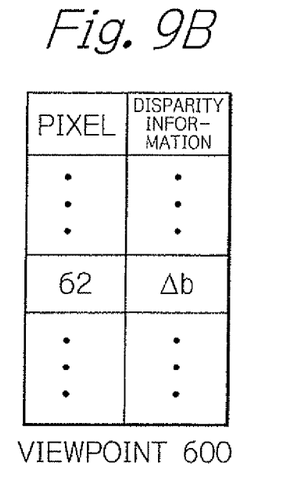

FIG. 8B shows a generation of the second disparity map associated with the viewpoint 600. As with the first disparity map generation, the search range is set in the pre-image 500, and a pixel corresponding to a pixel 62 is selected from pixels in the search range. In FIG. 8B, a pixel 52 is determined as the corresponding pixel to the pixel 62. In this case, an offset Δb from the center of the search range is recoded as disparity information for the pixel 62, as shown in FIG. 9B.

Figure 9C:
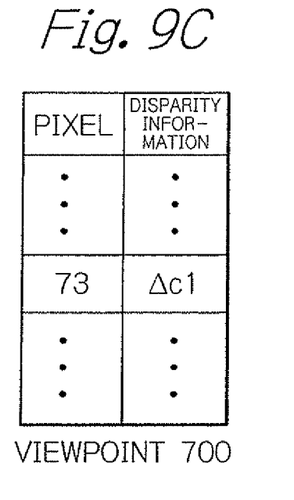

FIG. 8C shows a generation of the third disparity map associated with the viewpoint 700. Assuming an image from the viewpoint 700, search ranges are set in both pre-images 500 and 600, respectively, as shown in FIG. 8C. A size of the search range in the pre-image 500 can be decided based on a distance between viewpoints 500 and 700, and a size of the search range in the pre-image 600 can be decided based on a distance between viewpoints 600 and 700. The position of the center pixel of each search range is the same as a pixel 73 in the image 700. Then, straight lines, which pass through the pixel 73 and crosses pre-images 500 and 600 in each search range, are determined, and pixels at cross points in search ranges are selected as pixel pairs. In FIG. 8C, pixels 53, 63 and 73 lie on a straight line, and thus pixels 53 and 63 are a pixel pair. Since there are many straight lines, which pass through the pixel 73 and cross search ranges in both pre-images 500 and 600, many pixel pairs are selected. Then, one pixel pair is selected as corresponding pixels to the pixel 73 among a plurality of pixel pairs obtained from each line using a block matching method. In FIG. 8C, the pixel pair including pixels 53 and 63 is selected as corresponding pixels to the pixel 73. Thus, an offset Δc1 from the center of the search range in the pre-image 500 is recoded as disparity information for the pixel 73, as shown in FIG. 9C.

Since pixels 53, 63 and 73 lie on the straight line, it is possible to use an offset Δc2 as disparity information for the pixel 73 instead of the offset Δc1. The disparity information indicates corresponding pixels in the associated images to each pixel in an image from the associated viewpoint, and it is possible to use other ways instead of offset values, for example a tilt of the straight line connecting corresponding pixels of associated pre-images, for disparity information.

FIGS. 8A and 8B show the case that the associated viewpoint is the same as the viewpoint of the associated image, while FIG. 8C shows the general case. In FIGS. 8A and 8B, only one search range is set in either pre-image 500 or 600, while search ranges are set in both pre-images 500 and 600 in FIG. 8C. This is because the associated viewpoint in FIGS. 8A and 8B is the same as the viewpoint of one pre-image in the associated image pair, and the size of the search range in the pre-image is reduced to one pixel. The disparity map indicates corresponding pixel pairs in the associated two pre-images with reference to a pixel in an image from the associated viewpoint. However, corresponding pixel pairs indicated by the first, second and third disparity maps may not be the same, because associated viewpoints, i.e. reference viewpoints, are different. It is preferable to generate at least two disparity maps for each image pair including the first and second pre-images. The first viewpoint associated with the first disparity map is the same as a viewpoint of the first pre-image, and the second viewpoint associated with the second disparity map is the same as a viewpoint of the second pre-image. Preferably, further disparity maps are generated at viewpoints between the first and the second pre-images.

Figure 10:
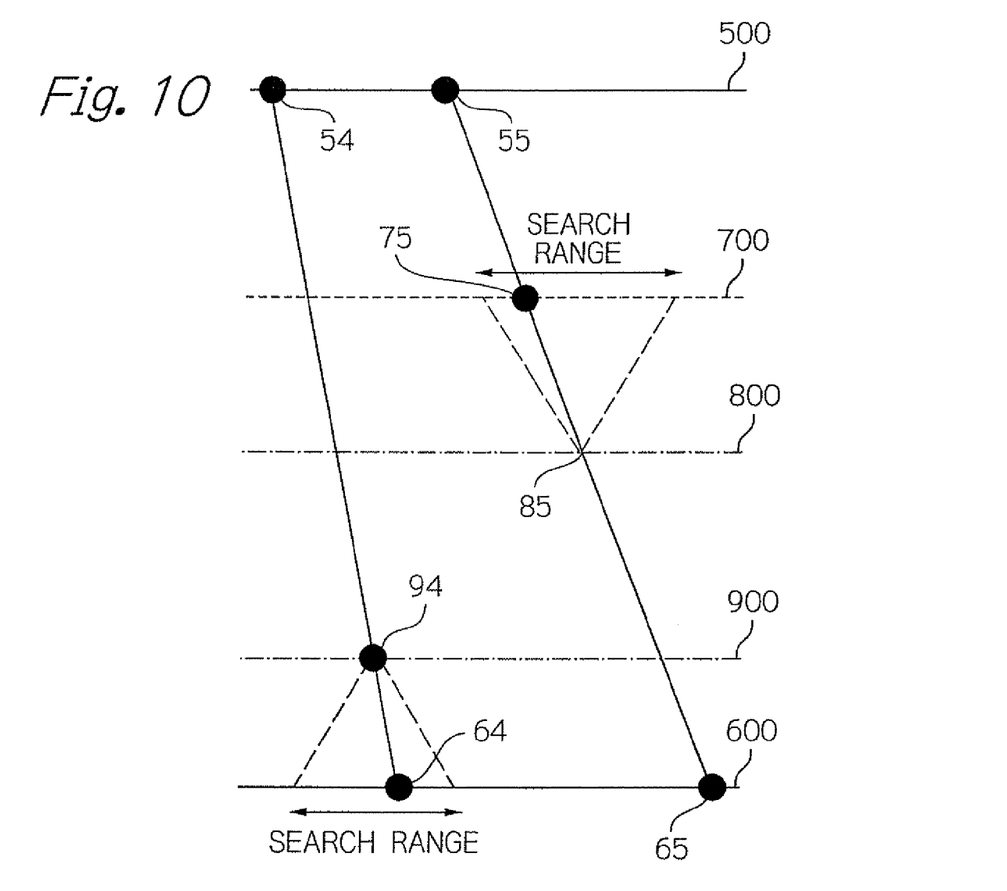
FIG. 10 is an explanation drawing of a decision of a pixel value in a viewpoint image based on the disparity map.

Next, a generation of an image at an arbitrary viewpoint by the transmission processing unit 4 and the viewpoint image generating unit 6 is described. The arbitrary viewpoint is specified by the user using the viewpoint transmitting unit 5. In the following description, an image from an arbitrary viewpoint specified by the user is referred to as "viewpoint image". FIG. 10 is an explanation drawing of a decision of a pixel value in a viewpoint image based on the disparity map and pre-images, in case the user specified viewpoint and viewpoints of pre-images are on the same line and direction. In FIG. 10, reference numerals 500, 600, 700, 800 and 900 denote images from viewpoints 500, 600, 700, 800 and 900. A distance between images is proportional to a distance between viewpoints, and images are arranged parallel each other. The storage unit 1 has pre-images from viewpoints 500 and 600, and three disparity maps associated with an image pair including pre-images 500 and 600. The first disparity map is associated with the viewpoint 500, the second disparity map is associated with the viewpoint 600, and the third disparity map is associated with the viewpoint 700. The viewpoints 800 and 900 are user specified viewpoints, and viewpoint images from viewpoints 800 and 900 are generated using the pre-image 500, the pre-image 600 and disparity maps.

The transmission processing unit 4 selects one disparity map, which viewpoint is the closest to the user specified viewpoint. The selected disparity map is used for generating the viewpoint image of the user specified viewpoint. For example, the closest viewpoint to the viewpoint 900 among viewpoints 500, 600 and 700 is the viewpoint 600. Thus, the viewpoint image generating unit 6 decides each pixel value in a viewpoint image 900 using the second disparity map associated with the viewpoint 600, the pre-image 500 and the pre-image 600, as explained next.

FIG. 10 shows a decision of a pixel value for a pixel 94 in the viewpoint image 900. First, a search range is set in an image of a viewpoint associated with the used disparity map. Since the second disparity map is associated with the viewpoint 600, the search range is set in the pre-image 600 as shown in FIG. 10. The center of the search range is the same pixel location as the pixel 94, and the size of the search range is predetermined or determined base on a distance between images 600 and 900. Preferably, the search range is increased as the distance increasing. Then, using the second disparity map, a corresponding pixel to a pixel in the search range is decided from pixels in the pre-image 500. If there are N pixels in the search range, N corresponding pixels are searched from the pre-image 500. Then, lines that links corresponding pixels in pre-images 500 and 600 are drawn. In case there are N pixels in the search range, N lines are drawn. The viewpoint image generating unit 6 search a line, which passes through the pixel 94, from a plurality of lines. In FIG. 10, the line linking corresponding pixels 54 and 64 passes through the pixel 94. In this case, the viewpoint image generating unit 6 decides a pixel value $PV_{94}$ for the pixel 94 using a pixel value $PV_{54}$ of the pixel 54 and a pixel value $PV_{64}$ of the pixel 64 by the following equation.

$$PV_{94}=K*PV_{54}+(1-K)*PV_{64}, 0<K<1$$

Here, the value K is a ratio of a distance between viewpoints 600 and 900 to a distance between viewpoints 500 and 600. If a plurality of lines pass through the pixel 94, one line is selected using predetermined criteria, for example, the least tilted line. If no line passes through the pixel 94, the closest line to the pixel 94 is selected.

FIG. 10 also shows a decision of a pixel value for a pixel 85 in a viewpoint image 800. Since the closest viewpoint among viewpoints 500, 600 and 700 to the viewpoint 800 is the viewpoint 700, the third disparity map associated with the viewpoint 700 is selected. Since the selected disparity map is associated with the viewpoint 700, a search range is set in a image 700 from the viewpoint 700 as shown in FIG. 10. The center of the search range is the same pixel location as the pixel 85, and the size of the search range is predetermined or determined base on the distance between images 700 and 800. Then, lines passing through the search range and linking corresponding pixels in the pre-images 500 and 600 are drawn using the disparity map associated with the viewpoint 700. If there are M pixels in the search range of the image 700, M lines are drawn. The viewpoint image generating unit 6 search a line, which passes through the pixel 85, from a plurality of lines. In FIG. 10, the line drawn by disparity information for the pixel 75 and connecting pixels 55 and 65 passes through the pixel 85. Thus, the pixel value for the pixel 85 is decided by the pixel value for the pixels 55 and 65 using the equation above. Even though a plurality of lines pass through the pixel 85 or no line passes through the pixel 85, one line is selected as already described.

Figure 11A:
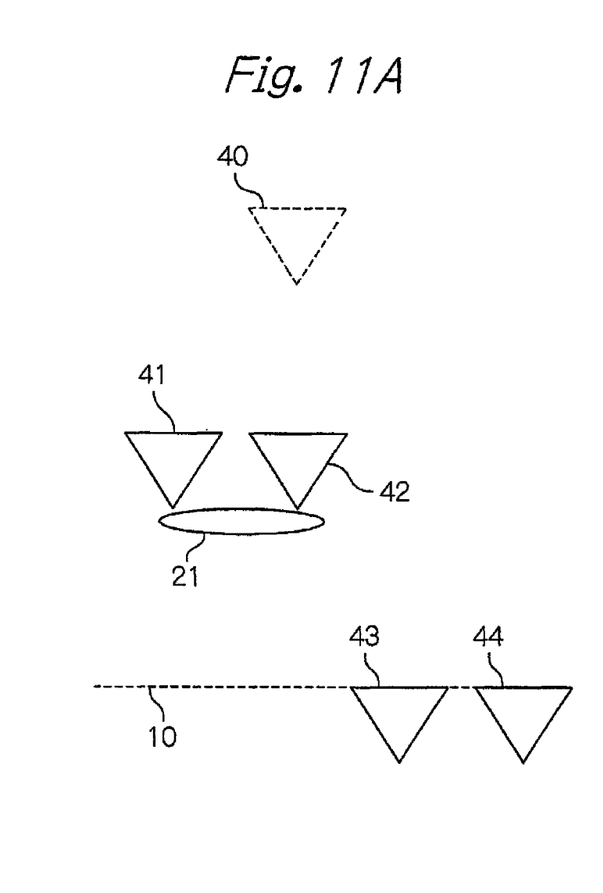
FIGS. 11A, 11B and 11C are explanation drawings of a generation of the viewpoint image.
Figure 11B:
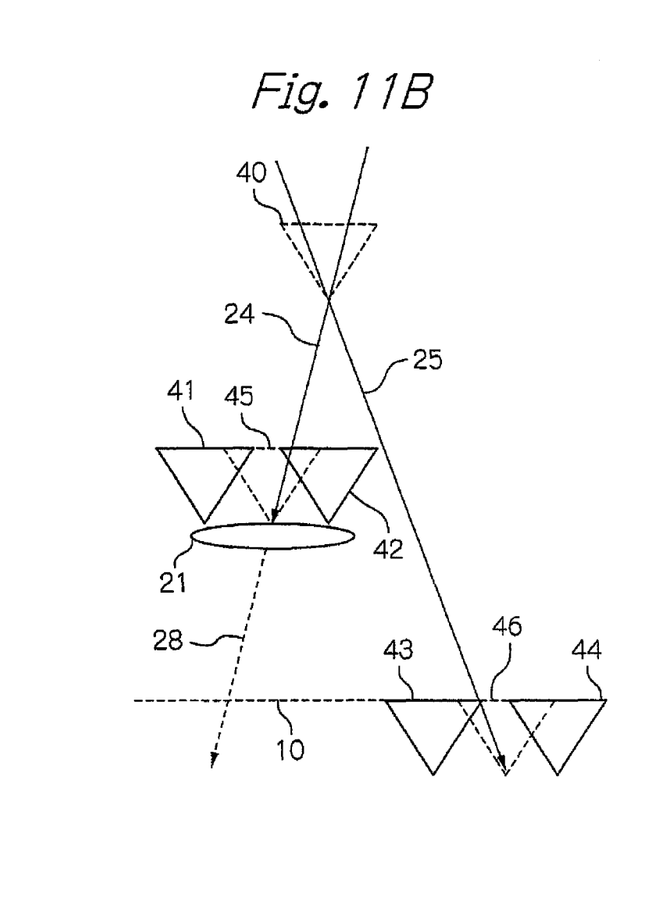
Figure 11C:
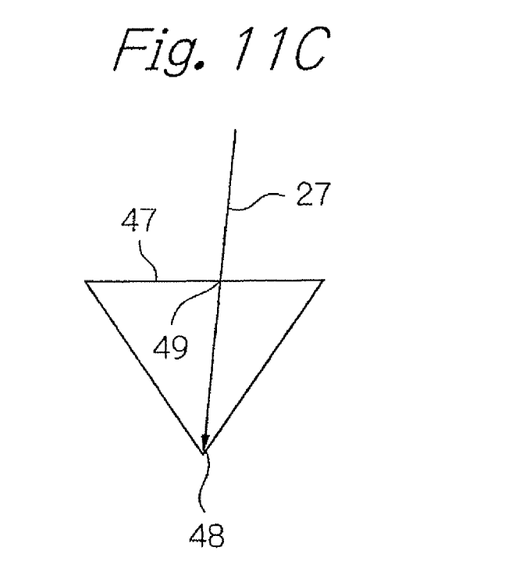

FIG. 10 shows the case that user specified viewpoint is on the same line, on which viewpoints of pre-images are arranged. Next, the generation of an image from an arbitrary viewpoint is described. FIGS. 11A, 11B and 11C are explanation drawings of a generation of a viewpoint image from an arbitrary viewpoint. In FIG. 11A, reference numerals 43 and 44 denote pre-images arranged on the straight line 10 in the first area, and reference numerals 41 and 42 denote pre-images in the second area generated by the second pre-image generating unit 34 due to an object 21. Further, in FIG. 11A, a reference numeral 40 denotes a viewpoint image. Representation of each image in FIGS. 11A and 11B are explained using FIG. 11C. In FIG. 11C, a reference numeral 47 is a plane, not a line. That is, each image is expressed as a square pyramid. In this representation, the plane 47 corresponds to an image plane having a plurality of pixels, a point 48 corresponds to a viewpoint, and a direction of a normal line from the point 48 to the plane 47 corresponds to a direction of the viewpoint. In this case, a pixel value for a pixel 49 of the plane 47 is decided by a ray 27, which passes through the pixel 49 and reaches the point 48.

To generate the viewpoint image 40, the viewpoint image generating unit 6 need to decides a pixel value caused by a ray 25 in FIG. 11B. To decide the pixel value by the ray 25, the transmission processing unit 4 selects a image pair having pre-images, which are arranged on either side of the ray 25. In FIG. 11B, an image pair including the pre-images 43 and 44 is selected. The viewpoint image generating unit 6 determines a viewpoint 46, of which the image has a pixel caused by the ray 25, and decides a pixel value of the pixel caused by the ray 25 based on the image pair having pre-images 43 and 44 and a disparity map associated with the image pair using a already described method with reference to FIG. 10.

In other words, the transmission processing unit 4 determines each ray corresponding to each pixel in a viewpoint image, and calculates a pixel value caused by each determined ray from image pairs, which sandwiches each determined ray. The pixel value can be adjusted based on the distance between the viewpoints 40 and 46.

Similarly, the viewpoint image generating unit 6 need to decide a pixel value caused by a ray 24 in FIG. 11B. To decide the pixel value by the ray 24, the transmission processing unit 4 selects a image pair including pre-images 41 and 42, and the viewpoint image generating unit 6 determines a viewpoint 45, of which the image has a pixel cause by the ray 24, and decides a pixel value of the pixel caused by the ray 24 based on pre-images 41 and 42 and a disparity map associated with pre-images 41 and 42 as already described with reference to FIG. 10. In FIG. 11B, a ray 28 indicated by a dotted arrow and the ray 24 are the same point in a ray-space. However, a pixel caused by the ray 28 is different from a pixel caused by the ray 24, because of the object 21. The transmission processing unit 4 determines to use the image pair including pre-images 41 and 42, not to use image pairs around a cross area of the ray 28 and the straight line 10, to decide a pixel value from viewpoint 40 based on model information.

In other words, if there are a lot of image pairs that sandwich an image having a pixel caused by a ray, which passes through the viewpoint image, the transmission processing unit 4 selects one image pair based on the arrangement of each object and the user specified viewpoint, and decides the pixel value based on the selected image pair. The arrangement of each object can be determined by model information of each pre-image.

To realize a free viewpoint video system, cameras are arranged in the first area towards the second area, where one or more objects are placed, and each camera captures objects. Normally, the number of cameras to be used is limited. Thus, an image from a viewpoint, where no camera is placed, should be generated from captured images by using interpolation techniques. However, it is not realistic to generate images from all possible viewpoints in advance, due to a limitation of a capacity of the storage unit 1 and processing load. In other words, it is not realistic to generate data for all rays in a ray-space in advance. Therefore, a disparity map is generated for a pair of pre-images, and a pixel corresponding to a ray, which is not generated in advance, is generated using the disparity map. A decision of a pixel value using the disparity map is easy, and it is possible to reduce data stored in the storage unit 1. The position of cameras, viewpoints for interpolated images in the first area and viewpoints for disparity maps associated with a pair of pre-images are predetermined based on a capacity of the storage unit 1. In the above embodiment, cameras 100 are arranged on the straight line 10 or circle line 11. However, cameras 100 can be arranged on any other line on the condition that it is possible to decide a correspondence relation of a ray in the ray-space to a pixel in each image. Since the correspondence relation can be calculated by camera parameters, it is possible to arrange cameras 100 on a arbitrary line to generate disparity maps.

With images in the first area and disparity maps associated with images in the first area, it takes a long time to generate an image from a viewpoint, which is occluded from the first area. For example, a pixel value caused by the ray 28 in FIG. 11B can be calculated easily using pre-images arranged around the cross region of the ray 28 and the straight line 10. On the contrary, because of the object 21, a pixel value caused by the ray 24 in FIG. 11B cannot obtained by pre-images around the cross region of the ray 28 and the straight line 10. Without pre-images in the second area, it is required to search pre-images having information about rays from the same point as the ray 24 using model information of pre-images in the first area as explained with FIG. 6, to decide the pixel value caused by the ray 24. Since this operation takes a long time, the invention prepares interpolated images and disparity maps at each object in the second area. With this configuration, images from any viewpoint can be generated quickly.

Figure 12:
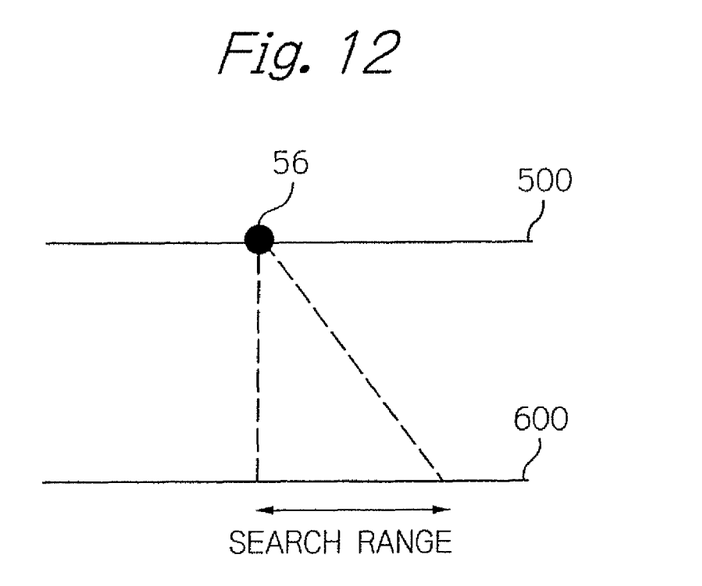
FIG. 12 shows another embodiment of a decision of a search range.

In the above embodiment, the search range is set such that a center of it faces the corresponding pixel. This is suitable for the circular arrangement of cameras. In case of the straight arrangement of cameras, it is possible to set a search range as shown in FIG. 12, because the direction of the shift is clear.

Figure 13:
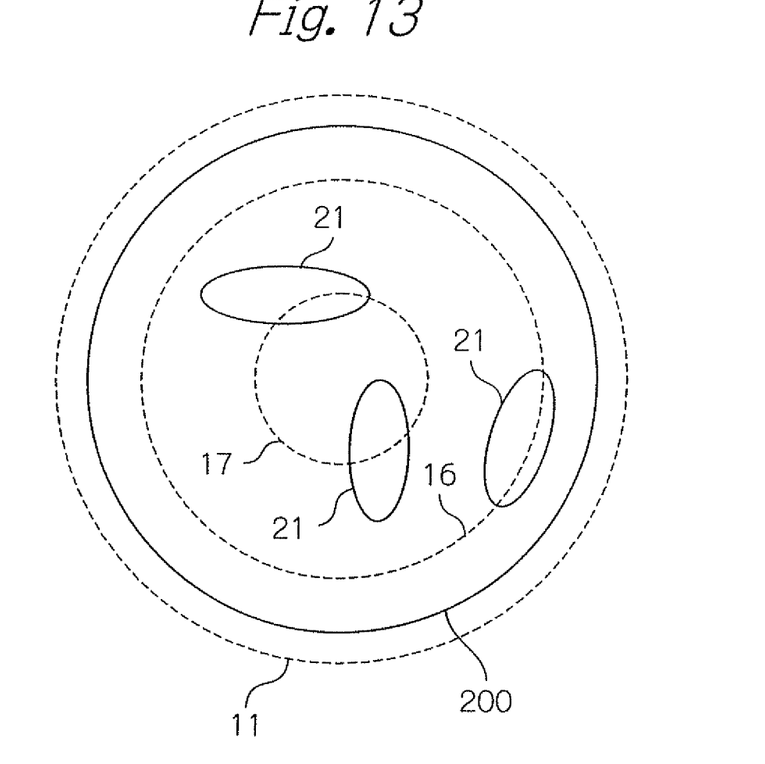
FIG. 13 shows another embodiment of a decision of a viewpoint in the second area.

In the above embodiment, viewpoints in the second area are set on, behind or around each object. In another embodiment, viewpoints in the second area are set on predetermined lines regardless the position of each object. In FIG. 13, outside of a circle line 200 is the first area, inside of the circle line 200 is the second area having objects 21, and cameras are arranged on the circle 11. In this embodiment, concentric circles 16 and 17 to the circle 11 are predetermined lines, and viewpoints in the second area are arranged on circles 16 and 17 towards the center of these circles 11, 16 and 17. In this case, the viewpoint determination unit 33 can be omitted, and processing load for generating data stored in the storage unit 1 can be reduced, although an image generation from occluded viewpoint from the first area becomes worse compared to the above described embodiment.

Figure 14:
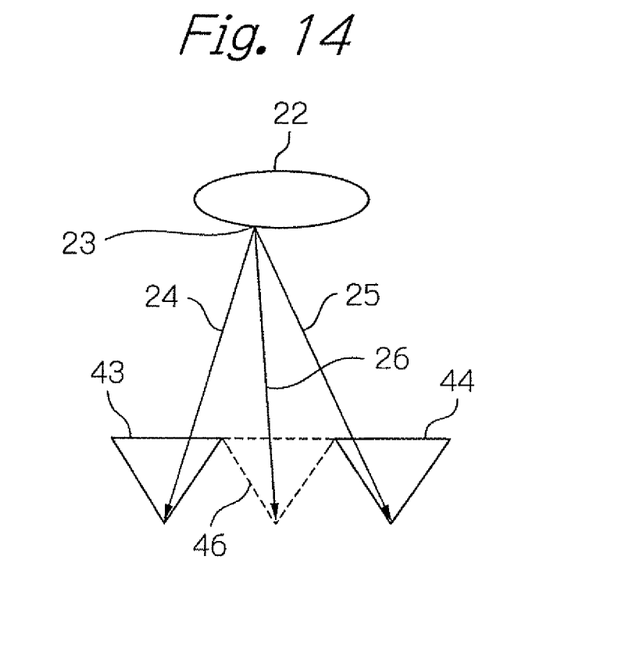
FIG. 14 is an explanation drawing of a decision of a pixel value in the viewpoint image based on a depth map.

Further, it is possible to use a depth map instead of the disparity map. The depth map indicates a position of each pixel, and generated in the pre-processing unit 31. As shown in FIG. 14, to decide a pixel value corresponding to a point 23 of an object 22 in a viewpoint image 46, a color value caused by a ray 26 needs to be calculated. Since it is possible to decide a pixel corresponding to the point 23 in a pre-image 43 from the death map for the pre-image 43, a color value caused by a ray 24 is obtained easily. Similarly, a color value caused by a ray 25 is obtained easily using a depth map for a pre-image 44. Thus, a color value of the ray 26 can be obtained by color values of rays 24 and 25. It is possible to compensate an optical axis based on camera parameters for viewpoint images.

Many modifications and variations will be apparent those of ordinary skilled in the art. The embodiments was chosen and described in order to best explain the principles of the invention. It should be understood that the present invention is not limited to the specific embodiments described in the specification, except as defined in the appended claims.

For example, the invention may be achieved by a program, which realizes the functions of the above embodiments on a computer system. Programs defining functions on the invention can be delivered to a computer system using computer readable storage media or via network. It should be understood the invention may be implemented by software, hardware or a combination of software and hardware.

The invention claimed is:

1. An image generating apparatus, comprising:
 a storage unit configured to store a plurality of images; and
 a disparity map generating unit configured to generate a disparity map associated with a pair of images including a first image and a second image,
 wherein
  the disparity map indicates corresponding pixels in the first and second images,
  viewpoints of images stored in the storage unit are placed on a first area having no object and a second area having one or more objects, images from viewpoints in the first area includes a whole or part of the second area, and images from viewpoints in the second area are generated based on images from viewpoints in the first area,
  viewpoints in the second area are set on a boundary of one or more objects in the second area, and
  cameras are positioned only at viewpoints disposed in the first area.

2. The image generating apparatus according to claim 1, wherein the disparity map is associated with a viewpoint, and indicates corresponding pixels in the first and the second images to each pixel in a third image from the viewpoint.

3. The image generating apparatus according to claim 2, wherein the viewpoint is between a first viewpoint of the first image and a second viewpoint of the second image, the same position as the first viewpoint or the same position as the second viewpoint.

4. The image generating apparatus according to claim 2, wherein the disparity map generating unit sets a search range in the first and second images such that a center of each search range is located at the same pixel position as a third pixel in the third image, determines a first pixel corresponding to the third pixel from the search range in the first image, and determines a second pixel corresponding to the third pixel from the search range in the second image.

5. The image generating apparatus according to claim 4, wherein the first, second and third pixels lie in a straight line, in case the first, second and third images are arranged parallel to each other with a distance proportional to a distance between viewpoints of images.

6. The image generating apparatus according to claim 1, wherein the storage unit stores images captured by cameras and images generated from the images captured by cameras.

7. The image generating apparatus according to claim 1, wherein viewpoints in the second area are on a predetermined line.

8. A computer program for functioning a computer as the apparatus according to claim 1.

9. A computer readable medium including the computer program according to claim 8.

10. An image generating apparatus, comprising:
 a storage unit configured to store a plurality of images; and
 a disparity map generating unit configured to generate a disparity map associated with a pair of images including a first image and a second image,
 wherein
  the disparity map indicates corresponding pixels in the first and second images,
  viewpoints of images stored in the storage unit are placed on a first area having no object and a second area having one or more objects, images from viewpoints in the first area includes a whole or part of the second area, and images from viewpoints in the second area are generated based on images from viewpoints in the first area, and
  viewpoints in the second area are set on a boundary of one or more objects in the second area, the boundary surrounding_the one or more objects, and cameras are positioned only at viewpoints disposed in the first area.

11. An image generating apparatus, comprising:
 a storage unit configured to store a plurality of images; and
 a disparity map generating unit configured to generate a disparity map associated with a pair of images including a first image and a second image,
 wherein
  the disparity map indicates corresponding pixels in the first and second images,
  viewpoints of images stored in the storage unit are placed on a first area having no object and a second area having one or more objects, images from viewpoints in the first area includes a whole or part of the second area, and images from viewpoints in the second area are generated based on images from viewpoints in the first area, and
  viewpoints in the second area are set on a boundary of one or more objects in the second area, the boundary being behind the one or more objects with respect to the first area, and cameras are positioned only at viewpoints disposed in the first area.

* * * * *